United States Patent

Grierson

[11] 3,816,675
[45] June 11, 1974

[54] ELECTRICAL GROUNDING DEVICE FOR TRACKED AIR CUSHION VEHICLES

[75] Inventor: David W. Grierson, Ann Arbor, Mich.

[73] Assignee: Rohr Corporation, Chula Vista, Calif.

[22] Filed: Oct. 28, 1971

[21] Appl. No.: 193,411

[52] U.S. Cl.............................. 191/49, 104/23 FS
[51] Int. Cl................................................. B60l 5/38
[58] Field of Search......... 104/23 FS, 134, 148 LM; 317/2 R, 2 D; 191/45, 47, 49, 50, 59, 59.1, 62, 66, 67, 72, 85, 91

[56] References Cited
UNITED STATES PATENTS

| 945,400 | 1/1910 | LaCroix | 191/49 |
| 1,872,351 | 8/1932 | Schaake | 191/67 |
| 2,911,607 | 11/1959 | Booth | 317/2 D |
| 3,631,809 | 1/1972 | Reece | 104/148 LM |

Primary Examiner—Gerald M. Forlenza
Assistant Examiner—D. W. Keen

[57] ABSTRACT

A safety electrical grounding device having a housing for attachment to an air cushion vehicle, a generally Y-shaped solenoid plunger in the housing which has arms extending from the housing and carrying a metallic shoe with teeth thereon, a braided copper strap with one end attached to the plunger through an opening in the housing and the other end for connection to the vehicle, springs in the housing urging the plunger upward to disengage the shoe from a reaction rail when the vehicle is in motion, and a solenoid coil in the housing which urges the plunger downward when actuated to engage the shoe teeth with the reaction rail when the vehicle is halted to provide a positive ground for the vehicle.

3 Claims, 2 Drawing Figures

PATENTED JUN 11 1974  3,816,675

INVENTOR.
DAVID W. GRIERSON
BY
George E. Pearson
ATTORNEY

ELECTRICAL GROUNDING DEVICE FOR TRACKED AIR CUSHION VEHICLES

BACKGROUND OF THE INVENTION

A tracked air cushion vehicle has no positive means of inherent electrical grounding capability as found on wheeled railroad cars and engines.

It is desirable, therefore, for safety reasons, that a positive electrical grounding device be provided air cushion vehicles that will solidly ground the vehicle to the reaction rail whenever the vehicle is not in motion.

SUMMARY OF THE INVENTION

In accordance with this invention apparatus is provided for electrically grounding one object to another object. To this end electrical path means is provided having one end connected to the object to be grounded and the other end normally restrained from engagement with the grounding object. When it is desired to effect grounding a force is applied to the electrical path means to overcome the restraining force and allow the other end of the electrical path means to positively engage the grounding object.

DESCRIPTION OF THE PREFERRED EMBODIMENTS

Figure 1:
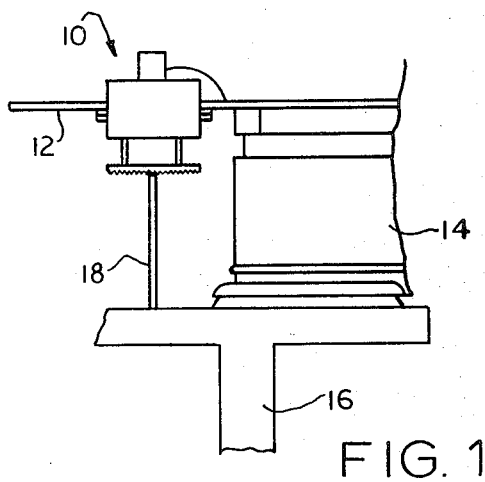
FIG. 1 is an end elevation showing of a portion of an air cushion vehicle incorporating the grounding device of the present invention.

Referring to FIG. 1, the grounding device 10 of the present invention is shown attached to the floor 12 of an air cushion vehicle 14 which is adapted to travel upon a rail platform 16 having a reaction rail 18 disposed thereon.

Figure 2:
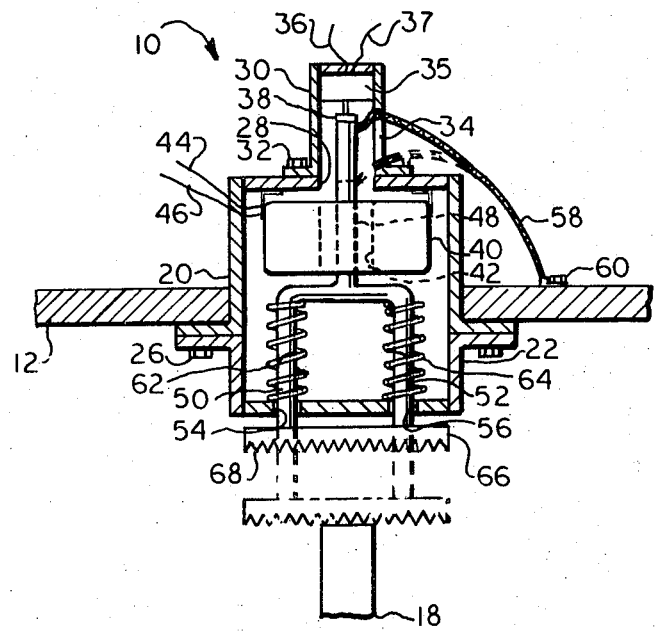
FIG. 2 is a cross sectional view showing the details of the grounding device of FIG. 1.

FIG. 2 shows the grounding device 10 as having a generally cylindrically shaped housing consisting of upper and lower flanged portions 20 and 22, respectively, secured together and to the floor 12 of the vehicle 14, as by bolts 26.

The upper housing portion 20 has an opening 28 therein adapted to have positioned thereover, a flanged, generally cylindrically shaped auxiliary housing member 30 attached, as by bolts 32 to the upper member portion 20.

The housing member 30 is provided with an opening 34 in the side thereof for a purpose to be more fully described hereinafter. Also positioned within the housing 30 is a microswitch 35 connected, as by electrical wires 36 and 37 to a control panel, not shown. A plunger portion 38 on the switch serves to close and open the switch when actuated upwardly and downwardly as will be more fully described hereinafter.

Also provided within the upper housing member portion 20 is toroidal solenoid coil 40 suitably positioned in the portion 20 as by bonding so as to place its center hole 42 in axial alignment with the opening 28. A pair of wires 44 and 46 are connected to a remote automatic train controller (not shown) on the vehicle for the purpose of supplying operating current to the coil when the vehicle is halted.

A generally Y-shaped metallic member has a body portion 48 positioned for axial movement within the hole 42 of the coil 40 and serves as a solenoid armature. The two arm portions 50 and 52 are positioned for movement through openings 54 and 56 provided in the lower housing member 22.

A flexible metallic electrical conductor 58, preferably a braided copper strap, has one end passed through the opening 34 and suitably bonded to the body portion 48 of the Y-shaped member for movement therewith. The other end of the conductor 58 is securely fastened to the floor 12 as by the bolt 60.

A pair of return springs 62 and 64 positioned around the arms 50 and 52 serve to normally urge the body portion 48 of the Y-shaped member in engagement with the plunger 38 to close the microswitch 35 to signal the control panel that the grounding device is not in engagement with the reaction rail 18.

A shoe 66, preferably fashioned from brass or aluminum is suitably attached to the arms 50 and 52. Teeth 68, formed from beryllium-copper alloy or other hard conductor material, are provided for positive mechanical engagement with the reaction rail 18 even through dirt, oil, scum or other contaminants possibly found on the rail, thus ensuring a good electrical connection therewith when downwardly urged to the indicated dashed line position. Accordingly, it will be appreciated that the shoe 68, Y-shaped member, and the bonding braid strap 58 constitute portions of an electrical path serving to positively ground the floor 12 of the vehicle 14 to the reaction rail 18 when the solenoid coil 40 is electrically actuated to urge the shoe 68 in contact with rail 18.

Operation of the grounding device 10 is as follows: Normally with the vehicle 14 in motion the springs 62 and 64 exert a force on the Y-shaped plunge member in an upward direction to maintain the shoe 66 and teeth 68 out of engagement with the reaction rail 18. However, each time that the vehicle 14 comes to a complete stop a signal from the automatic train controller (not shown) is supplied to the coil 40 through the wires 44 and 46 to exert downward electromagnetic force on the body portion 48 of the Y-shaped plunger in sufficient amount to override the upward force exerted by the springs 62 and 64. The plunger travels swiftly in a downward direction and forces the teeth 68 in biting engagement with the reaction rail 18 even through a layer of electrically insulating material deposited on the rail 18 such as rust, oil, dirt or the like, thus ensuring a positive electrical grounding of the vehicle 14 on the rail 18. In this position the plunger 38 opens the microswitch 35 to signal the control panel that the grounding device is now in engagement with the reaction rail 18. After the vehicle has complete its stop, the automatic train controller (not shown) de-energizes the coil 40, thus eliminating the electromagnetic force on the plunger, which allows the springs 62 and 64 to again exert upward force in the plunger and disengage the teeth 68 from the rail 18. It will be appreciated that the grounding device 10 can be operated anywhere on a reaction rail such as the rail 18.

Obviously many modifications and variations of the present invention are possible in the light of the above teachings. It is therefore to be understood that the invention may be practiced otherwise than as specifically described.

What is claimed is:

1. Apparatus for electrically grounding an air cushion vehicle to a reaction rail comprising:

A housing;

A flexible electrical conductor having one end adapted to be connected to the vehicle and the other end positioned within said housing through an opening therein;

A generally Y-shaped member within said housing having a body portion for movement therein and a pair of arms extending through openings respectively in said housing;

a metallic member positioned on said arms for movement therewith having teeth for engagement and disengagement with the rail;

a pair of spring members within said housing encompassing said arms respectively for normally exerting a force on said Y-shaped member in an upward direction to disengage said teeth from the rail; and a solenoid coil within said housing encompassing said body portion for exerting an overriding electromagnetic force thereon in a downward direction to engage said teeth with the rail upon electrical actuation.

2. Apparatus for electrically grounding an air cushion vehicle to a reaction rail comprising:

a housing adapted for attachment to the vehicle;

electrical path means extending through said housing and having one end portion adapted for connection to the vehicle, an intermediate portion consisting of a metallic member responsive to electromagnetic forces, said metallic member being comprised of a generally Y-shaped member having a body portion and a pair of arms extending through said housing and positioned for movement within said housing, and another end portion for engagement and disengagement with the rail;

means positioned within said housing for normally exerting a force on said intermediate portion in a direction to disengage said other end portion with the rail; and means positioned within said housing for exerting an overriding force on said intermediate portion in an opposite direction to engage said other end portion with the rail when desired.

3. Apparatus for electrically grounding an air cushion vehicle to a reaction rail comprising:

a housing adapted for attachment to the vehicle;

electrical path means extending through said housing and having one end portion adapted for connection to the vehicle, an intermediate portion positioned for movement within said housing, and another end portion comprised of a brass shoe containing beryllium-copper alloy teeth for engagement and disengagement with the rail;

means positioned within said housing for normally exerting a force on said intermediate portion in a direction to disengage said other end portion with the rail; and means positioned within said housing for exerting an overriding force on said intermediate portion in an opposite direction to engage said other end portion with the rail when desired.

* * * * *